United States Patent [19]
Park

[11] Patent Number: 5,109,541
[45] Date of Patent: Apr. 28, 1992

[54] CAR-MOUNTED TYPE BOOSTER SYSTEM FOR HAND-HELD PHONE

[75] Inventor: Chan Hyun Park, Seoul, Rep. of Korea

[73] Assignee: Hyundai Electronics Industries Co., Ltd., Kyounkido, Rep. of Korea

[21] Appl. No.: 614,449

[22] Filed: Nov. 16, 1990

[30] Foreign Application Priority Data

Nov. 29, 1989 [KR] Rep. of Korea ............... 1989-17456
Nov. 29, 1989 [KR] Rep. of Korea ............... 1989-17457

[51] Int. Cl.[5] .................................................. H04B 11/16
[52] U.S. Cl. ........................................ 455/89; 455/127
[58] Field of Search .................... 455/89, 90, 127, 343, 455/234; 379/60, 61

[56] References Cited

U.S. PATENT DOCUMENTS

| | | | |
|---|---|---|---|
| 4,625,240 | 11/1986 | Yablowski et al. | 455/234 |
| 4,723,304 | 2/1988 | Maeda | 455/89 |
| 4,870,698 | 9/1989 | Kabuyama et al. | 455/127 |
| 4,903,325 | 2/1990 | Yoshitake et al. | 455/127 |
| 4,962,543 | 10/1990 | Kuge et al. | 455/89 |
| 4,997,611 | 12/1990 | Maru | 455/127 |

*Primary Examiner*—Curtis Kuntz
*Attorney, Agent, or Firm*—Darby & Darby

[57] ABSTRACT

The present invention provides a car-mounted booster system comprising a first coupler, connected to the first duplexer and the power module, which regulates an output of the first duplexer; a first amplifier connected to the first coupler; an A/D converter connected to the first amplifier, which converts the analog output signal from the first amplifier to a predetermined digital code, and generates a transmission verification signal for verification of a fact whether the output signal from the first amplifier is a transmission signal or not; a second coupler connected to the second duplexer and the power module, which regulates an output of the second duplexer; a second amplifier connected to the second coupler; and a D/A converter connected to the A/D converter, the second amplifier, and the power module, which generates a control signal to control the power module according to a comparison result after comparison between a signal level from the second amplifier and a signal level from the A/D converter, and a power supply to the Power Module according to the transmission verification signal from the A/D converter.

3 Claims, 5 Drawing Sheets

CAR-MOUNTED TYPE BOOSTER SYSTEM FOR HAND-HELD PHONE

BACKGROUND OF THE INVENTION

This invention relates to a car-mounted type booster system for hand-held phone.

In general, hand-held phones had low antenna gain for limited carrying space, had relatively strong body effect while receiving and transmitting, and also had low output power for limited battery power.

SUMMARY OF THE INVENTION

It is an object to provide a car-mounted type booster system used in hand-held phone which is possible to obtain the similar reception sensitivity and characteristics as a car phone.

Accordingly, the present invention of a car-mounted type booster system achieves said object.

The present invention includes (1) a power control loop using the compared data between a RF output from the hand-held phone, converted into digital code by an A/D converter, and a reference value, and (2) adding a low-noise amplifier for compensating losses due to such connections as the connections of duplexers.

And also the power control loop can be comprised as transistor array circuits without using the A/D converter.

DETAILED DESCRIPTION OF THE PREFERRED EMBODIMENT

Figure 1:
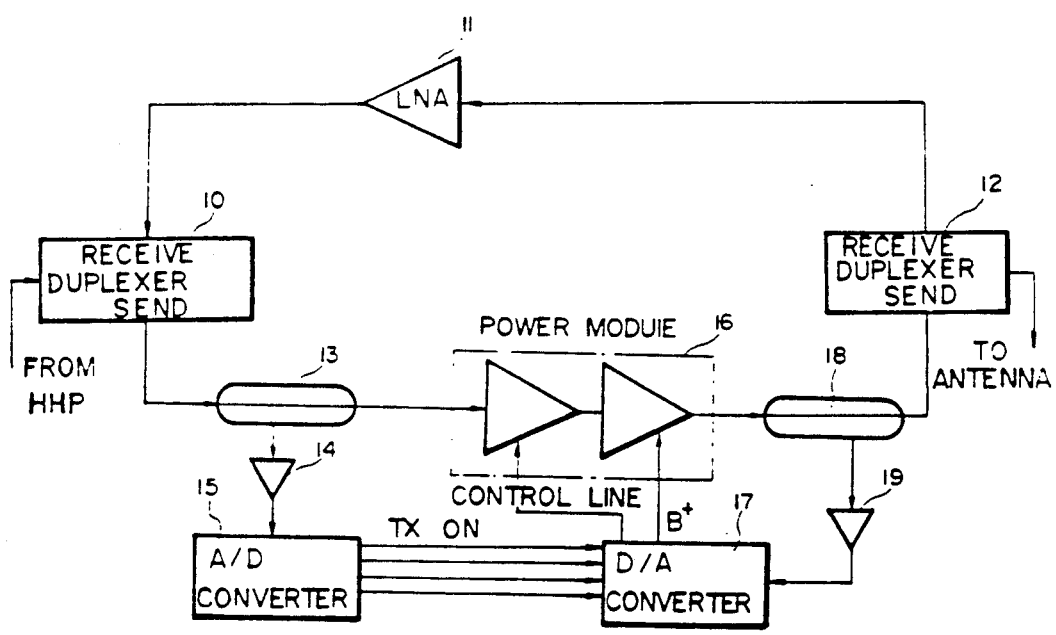
FIG. 1 is a block diagram for a preferred embodiment of the present invention.

FIG. 1 is a block diagram for the preferred embodiment of the present invention. The booster system includes a first duplexer 10, a second duplexer 12, a low-noise amplifier 11, a first coupler 13, a second coupler 18, a first amplifier 14, a second amplifier 19, and a Power Module 16. Also included are an A/D converter 15, and a D/A converter 17.

The signal from the hand-held phone HHP is applied to the coupler 13 through the duplexer 10 at first, and distributed into two lines. One of them is connected to the D/A converter 17 through the first amplifier 14 and the A/D converter 15. And the other is connected to the second duplexer 12 through the Power Module 16 and the coupler 18. The output of the second duplexer 12 is connected to the first duplexer 10 through the low-noise amplifier 11. And, the output of the second coupler 18 is connected to the D/A converter 17, which controls the Power Module 16, through the second amplifier 19.

Full-duplex RF signal is separated into transmission band (Tx) and reception band (Rx). By adding a low-noise amplifier 11 for the compensation of loss caused by a dependent connection between the first duplexer 10 and the second duplexer 12, the sensitivity of the reception part can be compensated.

The signal, received by the hand-held phone, is applied to the Power Module 16 through the first coupler 13. The first coupler 13 regulates the output of the duplexer 10 for a constant value. The Power Module 16 amplifies the output power signal from the first coupler 13.

Figure 2:
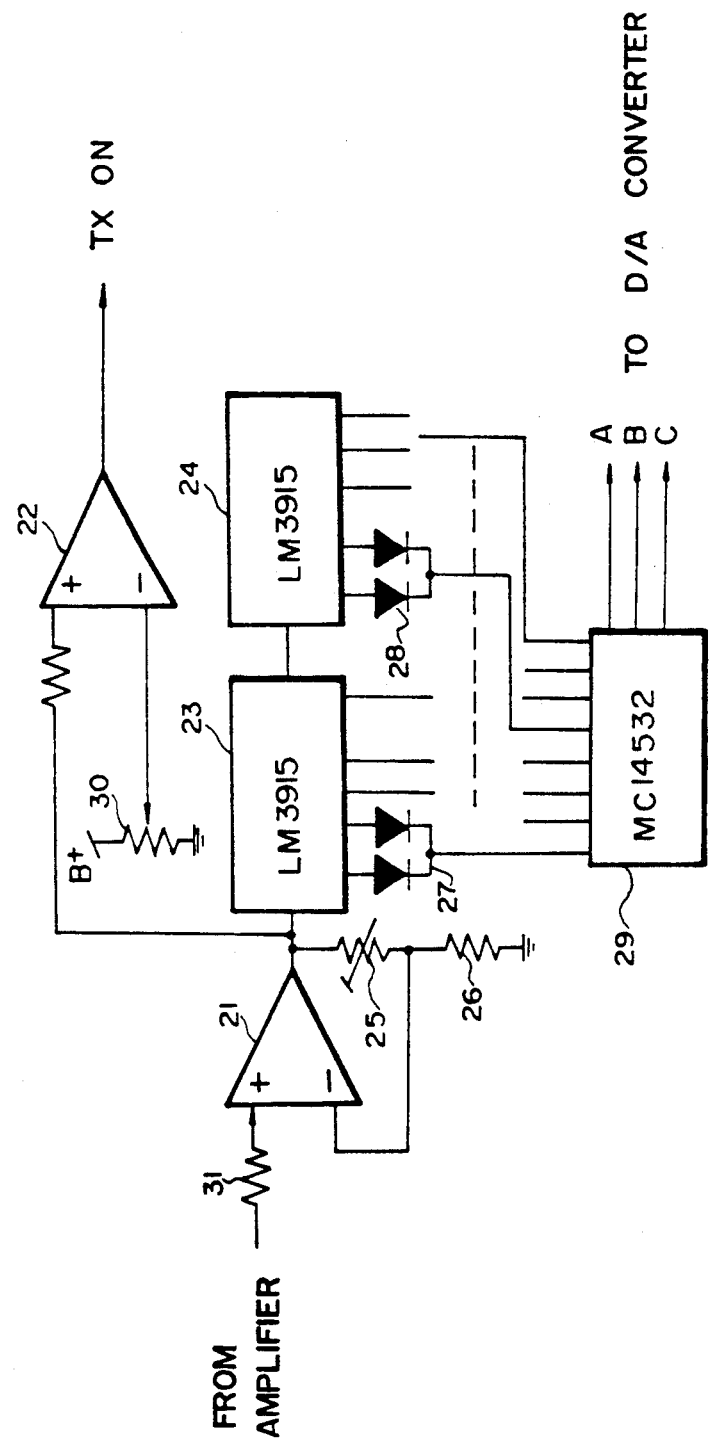
FIG. 2 is a circuit diagram of an A/D converter.

FIG. 2 is a circuit diagram of an A/D converter.

The A/D converter 15 is used for the detection of the received output level from the hand-held phone. The signal, amplified by the first amplifier 14, is applied to logarithmic scale bar graph IC's 23 and 24 through a first comparator 21 and a second comparator 22. The digital code for a specific voltage section segmented by the logarithmic scale bar graph IC's is applied to an encoder 29 through switching diodes 27 and 28. The segmentation described above is usually called window comparating. Then, the encoder 29 sends to D/A converter 17 a 3-bit signal generated along the 8-bit signal from the logarithmic scale bar graph IC's 23 and 24. In addition, there are variable resistors 25 and 30, and resistors 26 and 31 in FIG. 2.

Figure 3:
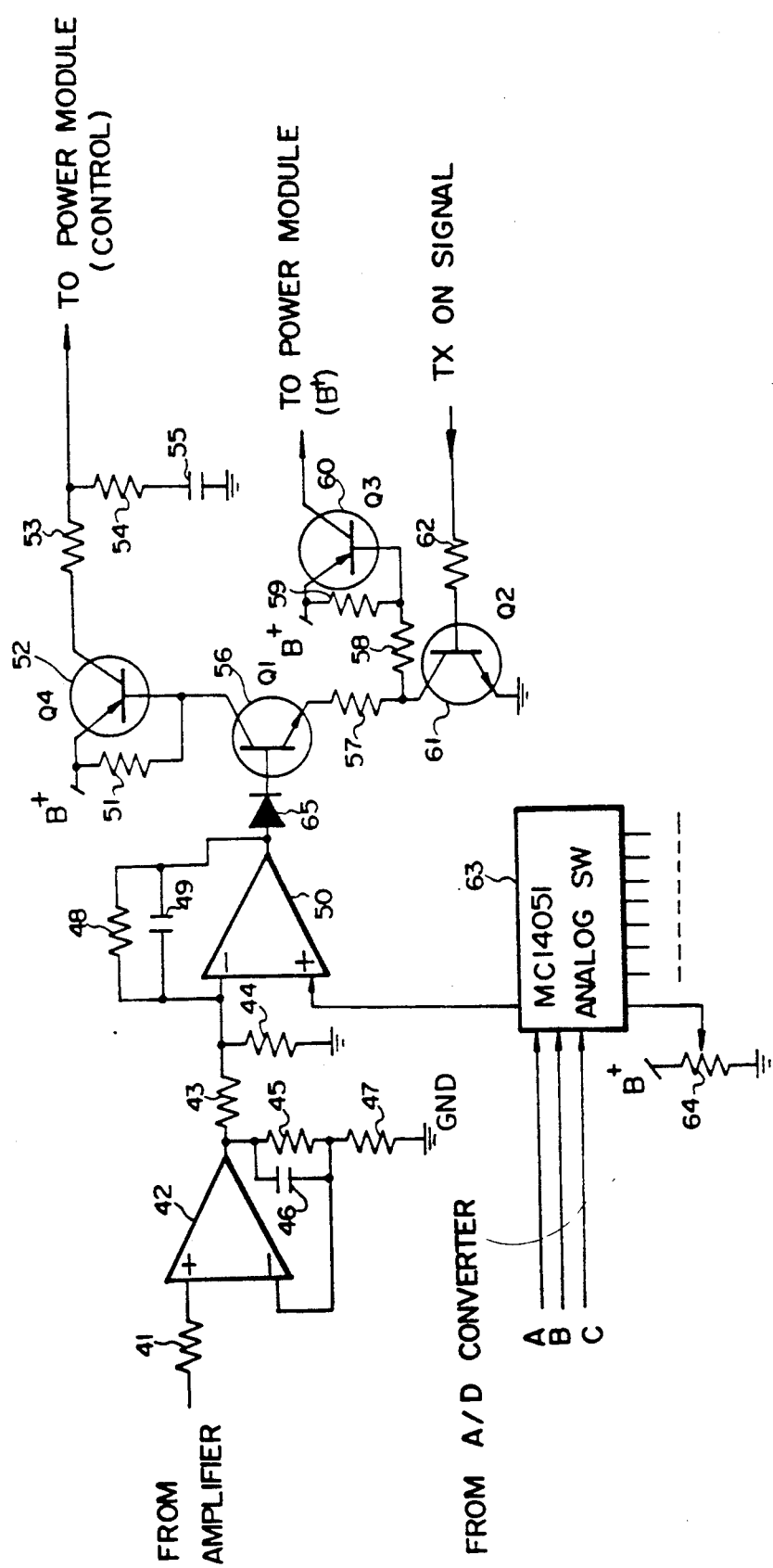
FIG. 3 is a circuit diagram of a D/A converter.

FIG. 3 is a circuit diagram of a D/A converter.

The Tx ON signal from the A/D converter, for determining whether the signal from the hand-held phone is a transmission signal Tx or not, is applied to the D/A converter through a resistor 62 and a transistor 61. By the signal from the transistor 61 which controls a transistor 60, the power supply to the Power Module 16 is switched on or off. Also, the 3-bit digital transmission output data is applied to an analog switch 63 of the D/A converter 17 as control signal. The voltage prepared by a potentiometer 64 is applied to a (+) terminal after passing through the 8-step analog switch 63. And then, after the comparison between the signal from the amplifier, amplified by an amplifier circuit 41 through 47, which is applied to a (−) terminal of the comparator comprising parts 48, 49, and 50, and the signal applied to the (+) terminals of the comparator, the result value is fed to a transistor 56 through a diode 65. According to the result value, the transistor 56 alternates between on and off. When the transistor 56 is on, a transistor 52 is off, because there is no current applied to the base terminal of the transistor 52, and vice versa. The output of the transistor 52 is applied to a control terminal of the Power Module. In FIG. 3, part numbers 51, 53, 54, 57, 58, and 59 are resistors, and 49 and 55 are condensers. In FIG. 1, as a voltage is applied to the control terminal of the Power Module 16, the signal from the first coupler 13, amplified enough to the same output power level as that of car phone, is radiated through the antenna of the duplexer 12.

Figure 4:
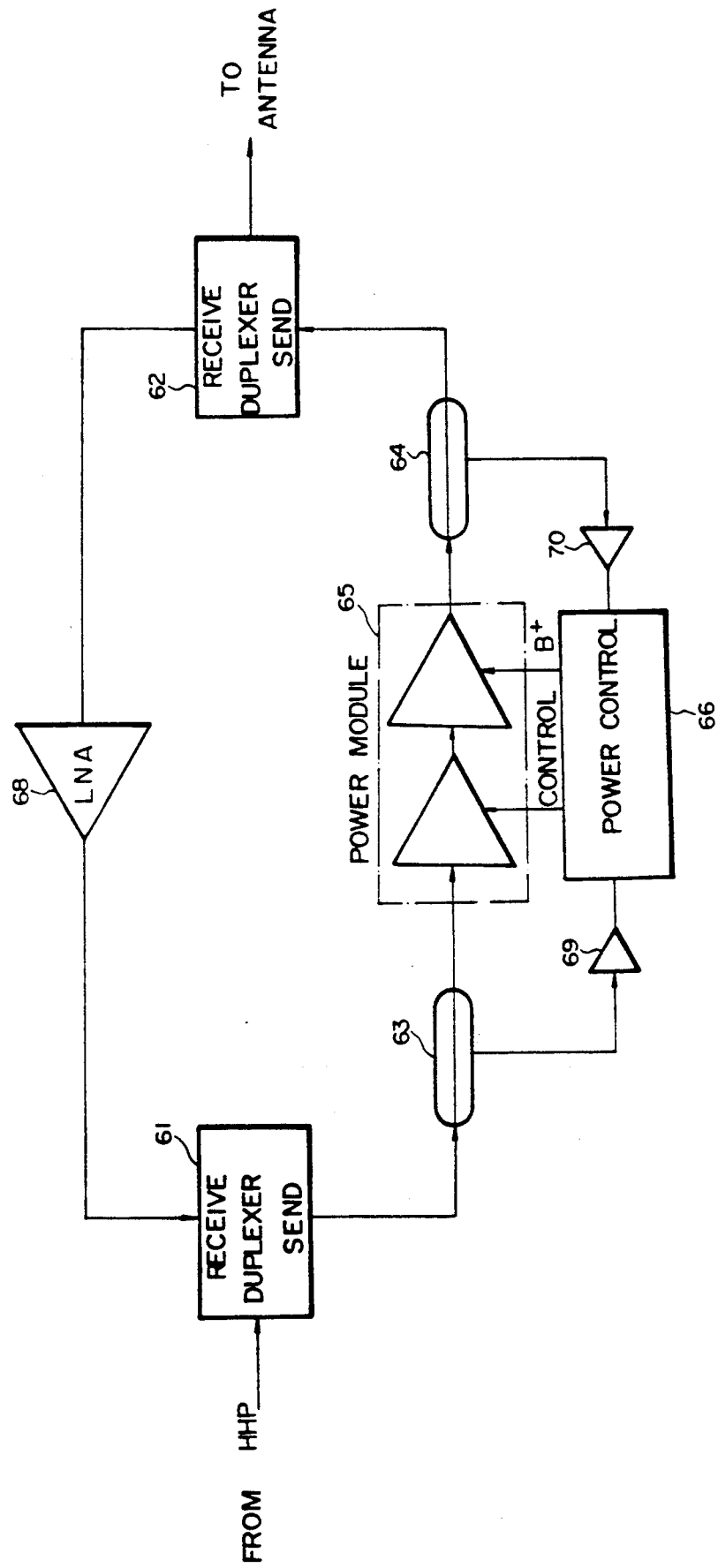
FIG. 4 is a block diagram for another preferred embodiment of the present invention.

FIG. 4 is a block diagram of another preferred embodiment of the present invention. The booster system includes a first duplexer 61, a second duplexer 62, a first coupler 63, a second coupler 64, a Power Module 65, a Power Control Part 66, a low-noise amplifier 68, a first amplifier 69, and a second amplifier 70.

The full-duplex RF signal is divided into the transmission band (Tx) and the reception band (Rx) by the first duplexer 61. And the reception sensitivity is improved by adding a low-noise amplifier 68 for compensation of loss due to the dependent connection between the first duplexer 61 and the second duplexer 62. Since the signal transmitted from the hand-held phone, is applied to the Power Module 65 through the first coupler 63, the first coupler 63 regulates the output of the first duplexer 61 to a constant level, and the Power Module 65 amplifies the power of the signal from the first coupler 63.

The Power Control Part 66 receives the signal from the first coupler 63 through the first amplifier 69 and the signal from the second coupler 64 through the second amplifier 70. In other words, the first amplifier 69 outputs the amplified output of compared value between a reference voltage and an output voltage of the first coupler 63, and the second amplifier 70 outputs the amplified output of compared value between a reference voltage and an output voltage of the second coupler 64.

Figure 5:
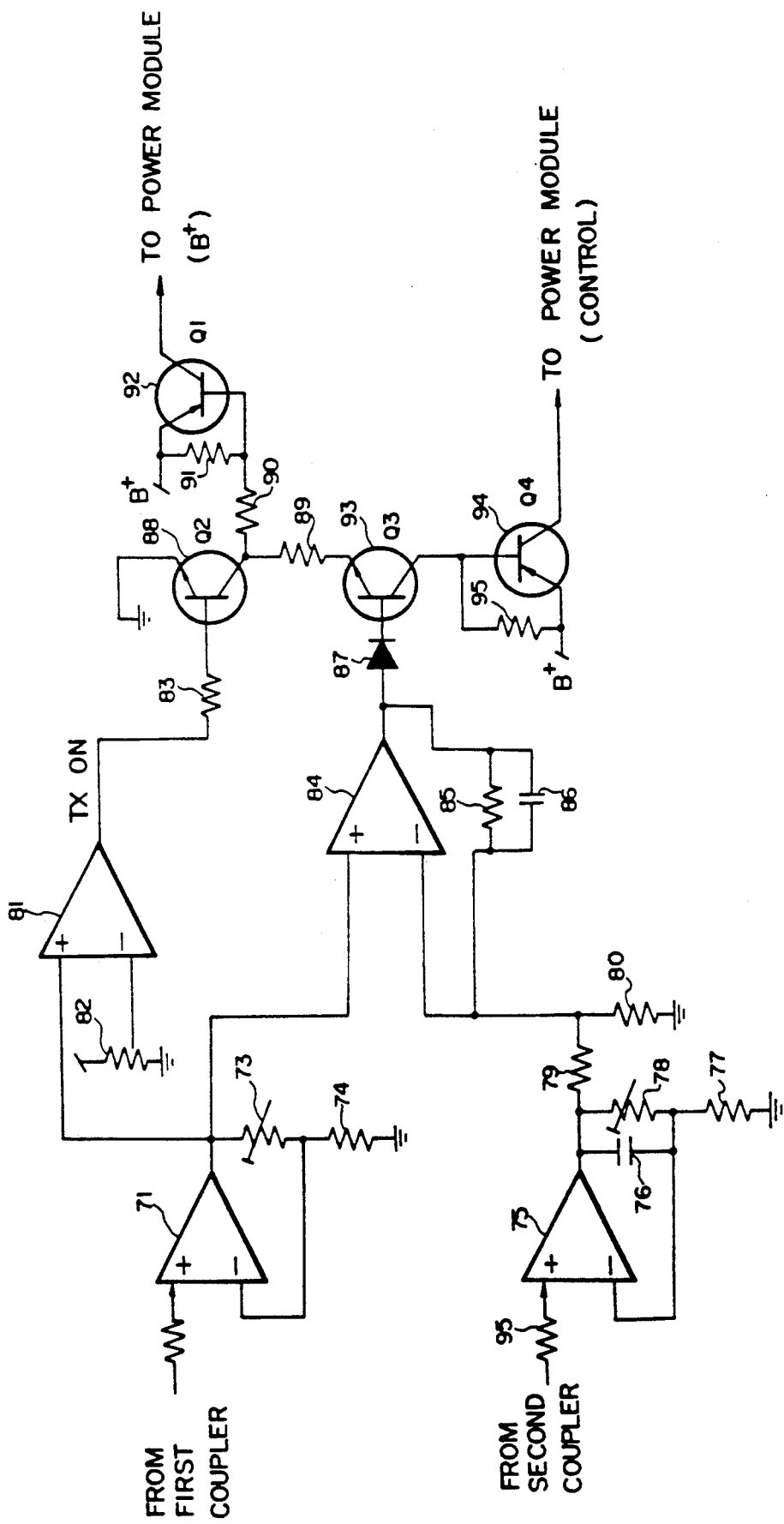
FIG. 5 is a circuit diagram of a power control part.

FIG. 5 is a circuit diagram of a Power Control Part and first and second amplifiers.

In FIG. 5, the first amplifier includes resistors 71 and 74, potentiometer 73, and a differential amplifier 71, and the second amplifier includes resistors 95, 79, 80, and 77, a condenser 76, and a differential amplifier 75. After the comparison between the output signal from the first amplifier 69 and the output signal from the second amplifier 70, the comparator, comprising a resistor 85, a condenser 86, and an differential amplifier 84, applies the result value to a transistor 93 through a diode 87. Particularly, the output voltage of the first amplifier 69 is defined as reference voltage for the comparator. Therefore, the operation of the Power Control Part having a feedback loop depends on the detection output of the first coupler 63.

If the output signal of the comparator goes to low level, that turns the transistor 93 on, and if that goes to low level, that turns the transistor 93 off. Then the output of the transistor 93 drives a transistor 94, and the output of the transistor 94 controls the operation of the Power Module 65. The comparator comprising a potentiometer 82 and an amplifier 81 applies the compared value between the output voltage of the first amplifier 69 and the reference voltage specified by the potentiometer 82 to a transistor 88. In case the output signal of the comparator comprising parts 81 and 82 is low level, the transistor 88 turns off, then it cannot drive a transistor 92. However, in case the output signal of the comparator is high level, the transistor 88 turns on, then it drives the transistor 92. Subsequently, the output is applied to the Power Module 65, then it controls the power supply to the Power Module 65. In result, the hand-held phone signal through the first coupler 63 is amplified enough to the level desired and radiated by means of antenna through the second duplexer 62.

In FIG. 5, the reference numbers 83,89,90,91, and 95 show resistors, respectively.

The present invention makes a hand-held phone which equals a car phone in performance possible, and has a great flexibility and more improved RF characteristics. Especially, it has good reception sensitivity and image rejection performance against the 2nd harmonic spurious signal and the 3rd harmonic spurious signal. In addition, it also has extremely good band limit effect because of the dependent connection of the duplexers.

What is claimed is:

1. In a car-mounted type booster system for hand-held phone comprising a first duplexer connected to the hand-held phone, a second duplexer connected to an external antenna, a low-noise amplifier compensating a loss due to an interconnection between the first duplexer and the second duplexer; and a power module interconnecting the first duplexer and the second duplexer, which sends a signal from the first duplexer to the second duplexer after amplification, the booster system further comprising:

a first coupler, connected to the first duplexer and the power module, which regulates an output of the first duplexer;

a first amplifier connected to the first coupler;

an A/D converter connected to the first amplifier, which converts the analog output signal from the first amplifier to a predetermined digital code, and generates a transmission verification signal for verification of a fact whether the output signal from the first amplifier is a transmission signal or not;

a second coupler connected to the second duplexer and the power module, which regulates an output of the second duplexer;

a second amplifier connected to the second coupler; and a D/A converter connected to the A/D converter, the second amplifier, and the power module, which generates a control signal to control the power module according to a comparison result after comparison between a signal level from the second amplifier and a signal level from the A/D converter, the D/A converter applying power supply to the power module according to the transmission verification signal from the A/D converter.

2. A booster system according to claim 1, the A/D converter comprising:

a first comparator comparing the output level from the first amplifier with a predetermined reference level;

a second comparator, comparing an output of the first comparator with a predetermined reference level, which generates the transmission verification signal;

logarithmic scale bar graph IC's receiving the output from the first comparator, which code an input voltage level into a specific digital code; and an encoder connected to the logarithmic scale bar graph IC's.

3. In a car-mounted type booster system for hand-held phone comprising a first duplexer connected to the hand-held phone; a second duplexer connected to an external antenna; a low-noise amplifier interconnected between the first duplexer and the second duplexer, which compensates a loss due to the interconnection; and a power module which sends a signal from the first duplexer to the second duplexer after power amplification, the booster system further comprising:

a first coupler connected to the first duplexer and the power module, which regulates an output of the first duplexer;

a first amplifier connected to the first coupler;

a second coupler connected to the second duplexer and the power module, which regulates an output of the power module;

a second amplifier connected to the second coupler; and a power control means connected to the first amplifier, the second amplifier, and the power module which controls the power module according to a control signal, generated after a comparison between an output signal level from the first amplifier and an output signal level from the second amplifier, and applies power to the power module according to a transmission verification signal generated for verification that decides whether a signal from the first amplifier is a transmission signal or not after a comparison between a signal level from the first amplifier and a predetermined reference level.

* * * * *